United States Patent [19]

Narita

[11] Patent Number: 5,005,441

[45] Date of Patent: Apr. 9, 1991

[54] LINE PRESSURE CONTROL FOR AUTOMATIC TRANSMISSION

[75] Inventor: Yasushi Narita, Yokohama, Japan

[73] Assignee: Nissan Motor Co., Ltd., Yokohama, Japan

[21] Appl. No.: 339,101

[22] Filed: Apr. 17, 1989

[30] Foreign Application Priority Data

Apr. 15, 1988 [JP] Japan ................... 63-91814
Apr. 26, 1988 [JP] Japan .................. 63-101318

[51] Int. Cl.$^5$ ........................... B60K 41/06
[52] U.S. Cl. ........................ 74/866; 74/867
[58] Field of Search ..................... 74/866-869

[56] References Cited

U.S. PATENT DOCUMENTS

| | | | |
|---|---|---|---|
| 4,346,627 | 8/1982 | Kawamoto et al. | 74/869 |
| 4,584,908 | 4/1986 | Nishikawa et al. | 74/866 |
| 4,631,982 | 12/1986 | Miki et al. | 84/866 X |
| 4,680,992 | 7/1978 | Hayasaki et al. | 74/869 |
| 4,721,018 | 1/1988 | Harada et al. | 74/867 X |
| 4,745,826 | 5/1988 | Nishikawa et al. | 74/866 |
| 4,785,689 | 11/1988 | Iwatsuki | 74/866 |
| 4,807,496 | 2/1989 | Hayasaki et al. | 74/866 |
| 4,850,251 | 7/1989 | Kawayama et al. | 74/869 X |

OTHER PUBLICATIONS

Nissan Full-Range Automatic Transmission RE4R01A Type, Service Manual, (A261C07) issued on Mar. 1987, by Nissan Motor Company Limited.

Primary Examiner—Dwight Diehl
Attorney, Agent, or Firm—Foley & Lardner, Schwartz, Jeffery, Schwaab, Mack, Blumenthal & Evans

[57] ABSTRACT

An automatic transmission is disclosed wherein an accumulator back-up pressure is variable in response to engine load and also to the progress of a shift taking place. A line pressure solenoid is provided which controls a signal pressure supplied to an accumulator control valve which generates the accumulator back-up valve supplied to an accumulator that is arranged to soften an increase in servo activating hydraulic fluid pressure supplied to a frictional device during the shift.

7 Claims, 14 Drawing Sheets

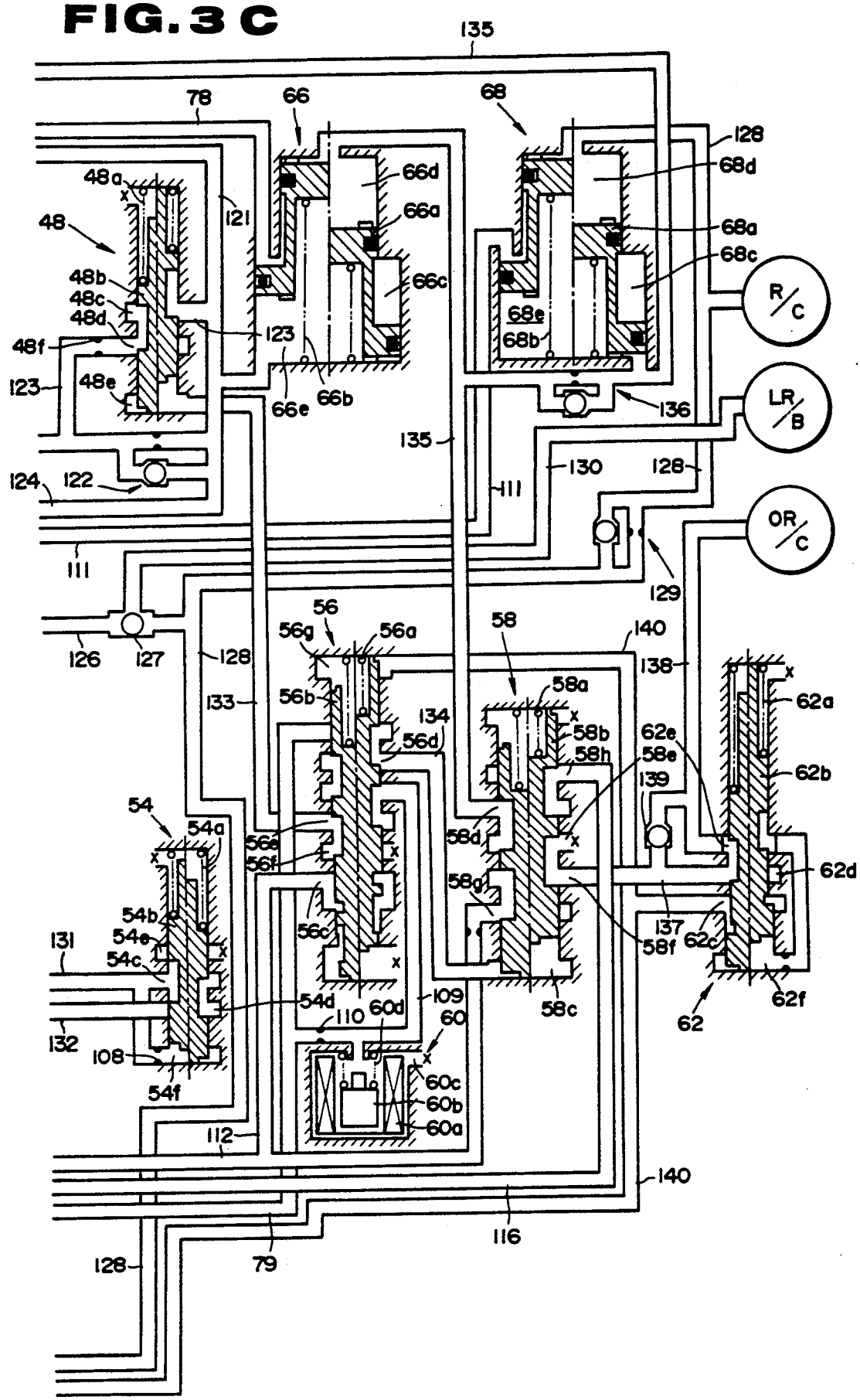

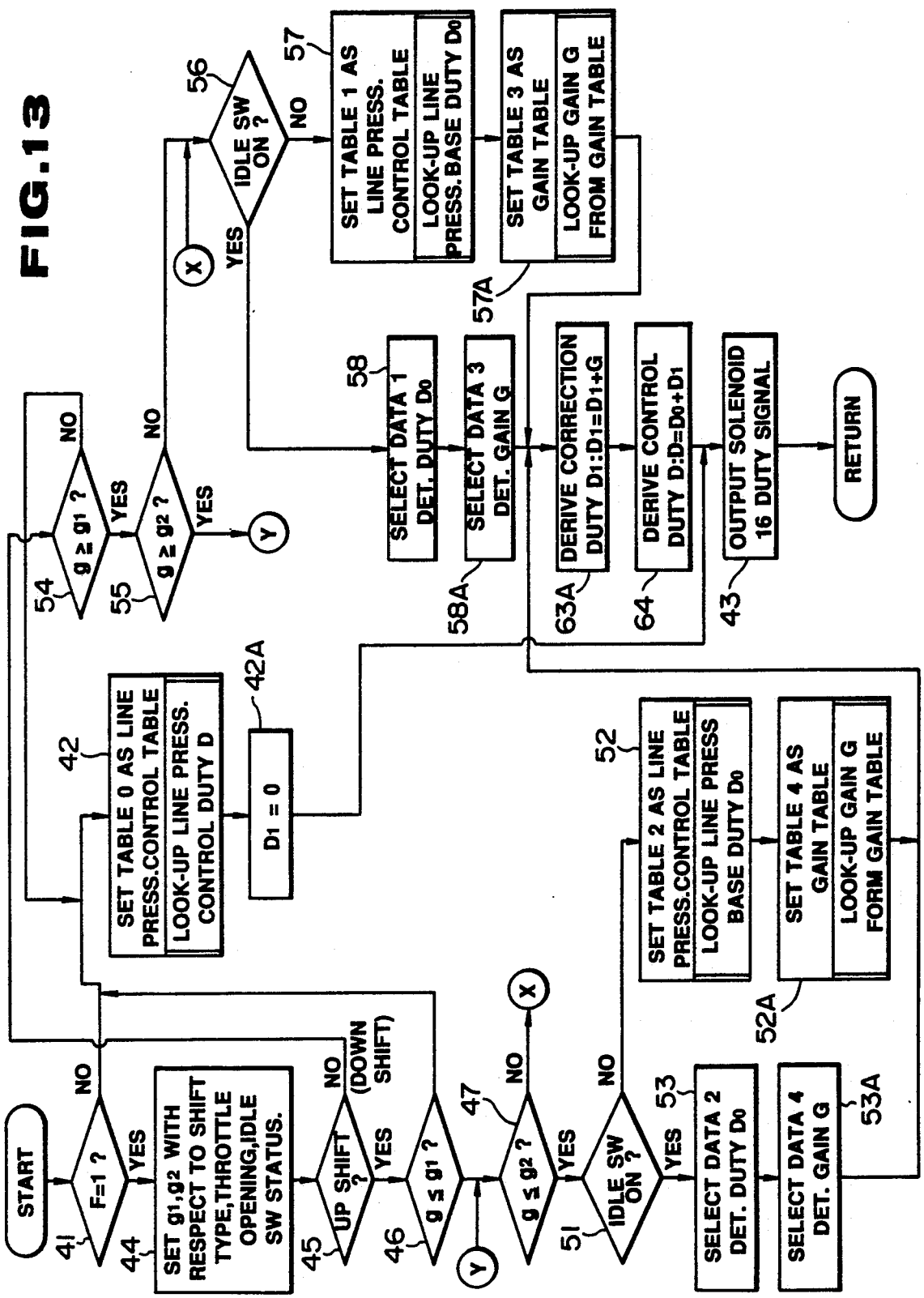

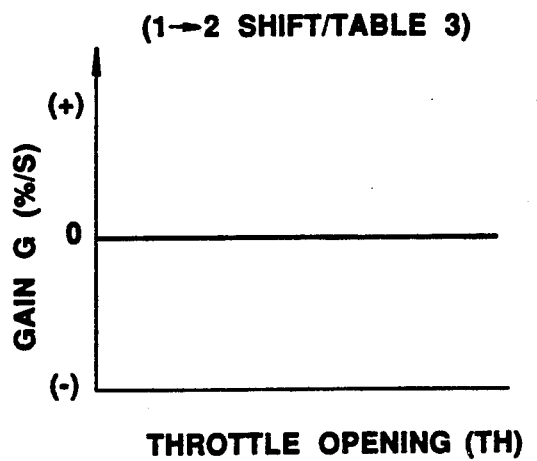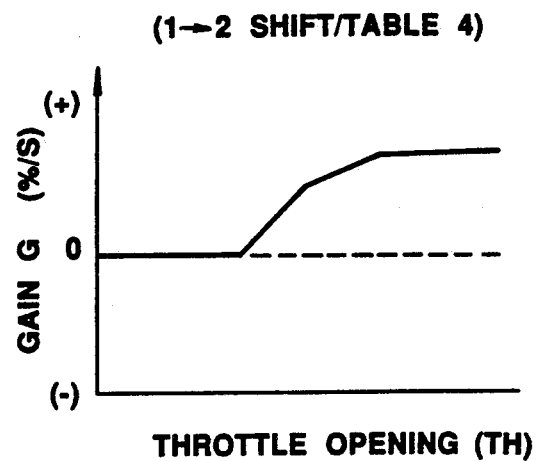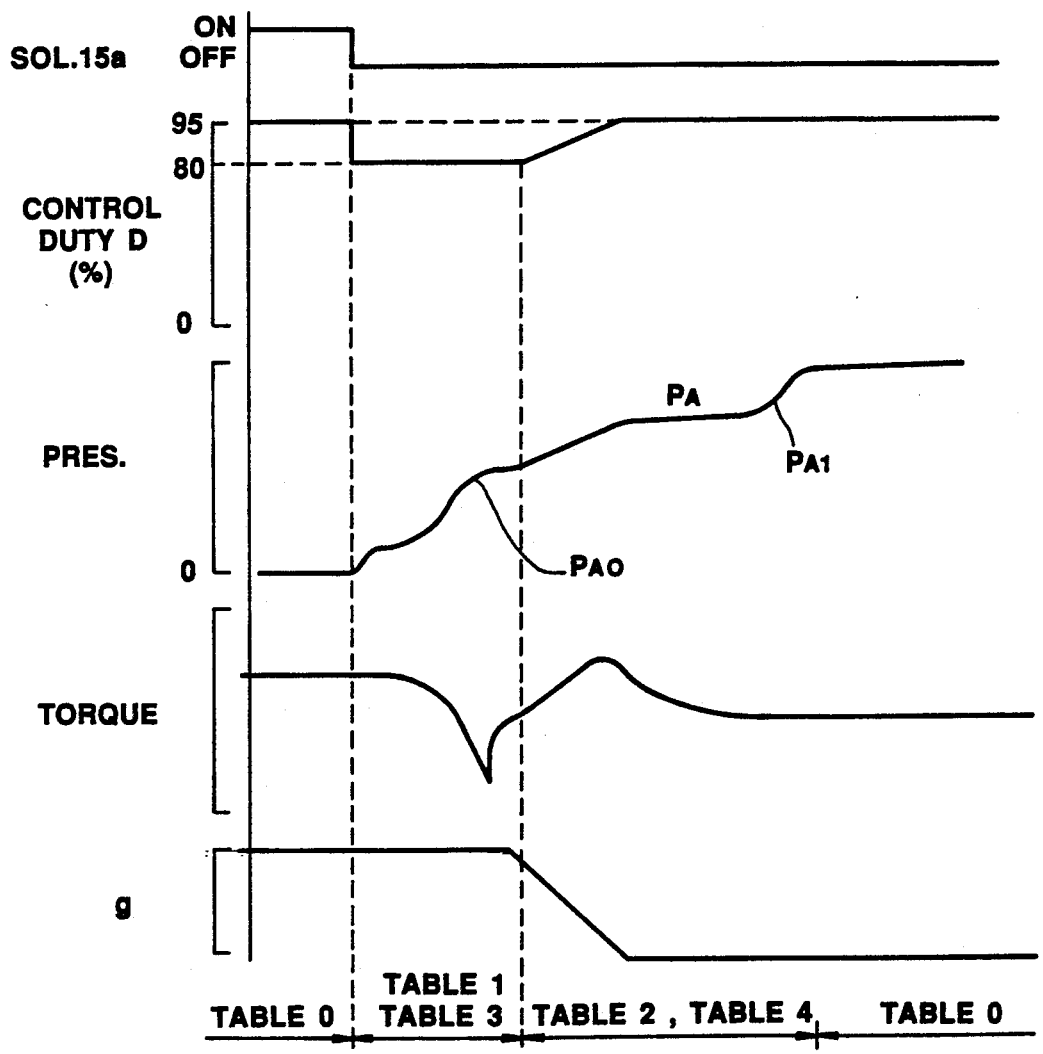

LINE PRESSURE CONTROL FOR AUTOMATIC TRANSMISSION

BACKGROUND OF THE INVENTION

The present invention relates to a line pressure control system for an automatic transmission, and more particularly to a system for controlling a servo activating hydraulic fluid pressure during shifting between different gear positions.

An automatic transmission of the RE4R01A type, manufactured by Nissan Motor Company Limited, is known. This known automatic transmission is described in "NISSAN FULL-RANGE AUTOMATIC TRANSMISSION RE4R01A TYPE, SERVICE MANUAL, (A261C07)" issued on Mar., 1987 by NISSAN MOTOR COMPANY LIMITED, and also disclosed in U.S. Pat. No. 4,680,992 issued to Hayasaki et al. on July 21, 1987. This United States Patent corresponds to European Patent Application No. 86 110 832.2 (publication number: 0214467). This automatic transmission comprises an accumulator having an accumulator piston for defining an accumulator chamber which forms a part of a hydraulic circuit leading to a frictional device and an accumulator back-up pressure chamber. During non-shifting mode when there is no supply of servo activating hydraulic fluid pressure to the frictional device, the accumulator piston is urged by the accumulator back-up pressure against an accumulator spring to take a position where the accumulator spring is compressed. The hydraulic circuit includes a shift valve and starts supplying a servo activating hydraulic fluid to the frictional device when the shift valve shifts to effect a predetermined shift between gear pisitions. Since the accumulator chamber forms the part of the hydraulic circuit, the hydraulic pressure in the accumulator chamber increases, tending to urge the accumulator piston against the bias force due to the back-up pressure. However, the accumulator piston stays in this position until the sum of the forces due to the accumulator spring and the servo activating hydraulic fluid overcomes the opposed force due to the accumulator back-up pressure. Under this condition, the servo activating hydraulic fluid pressure supplied to the frictional device increases quickly. When the above-mentioned sum of the forces exceeds the opposed force, the accumulator piston begins to move against the opposed force due to the accumulator back-up pressure in a direction to expands the accumulator spring. During this movement of the accumulator piston, the servo activating hydraulic fluid pressure increases further but at a gradual rate. When the accumulator piston moves to another limit position, the servo activating hydraulic fluid pressure further increases quickly to the level as high as the level of a system fluid pressure, i.e., a so-called line pressure. The pressure increase during the stroking of the accumulator piston is often called as a shelf portion of the pressure increase. With this pressure increase at the shelf portion, the engagement within the frictional device progresses without causing any substantial shock. The shelf portion pressure is determined by the accumulator back-up pressure, a ratio of a pressure acting area of the accumulator piston exposed to the servo activating hydraulic pressure to a pressure acting area exposed to the accumulator back-up pressure, and a preset load and a spring constant of the accumulator spring. Thus, with the same magnitude of the accumulator back-up pressure, the gradient of the shelf pressure becomes always constant. The accumulator back-up pressure is generated by an accumulator control valve controlled by a line pressure control solenoid. The accumulator control valve uses the line pressure as a base pressure and effects pressure regulation in response to a signal pressure controlled by the solenoid valve to give the accumulator back-up pressure variable with the signal pressure. During the non-shifting mode, the line pressure solenoid is controlled in response to the magnitude of a load on the engine which is expressed in terms of a throttle opening degree of the engine throttle valve by retrieving a data table prepared for the non-shifting mode based on the throttle opening degree. Another data table is prepared for the shifting mode, and the line pressure solenoid is controlled in response to the throttle opening degree by retrieving this other data table based on the throttle opening degree such that the level of the accumulator back pressure varies in proportion to the throttle opening degree. Thus, the level of the shelf pressure increases as the engine load increases even though the gradient of the shelf pressure remains substantially unchanged.

With the accumulator back-up pressure kept constant, the gradient of the shelf pressure becomes large when a spring with a large spring force (namely, a large set load) is selected as the accumulator spring, while the gradient becomes small when a spring with a small spring force is selected as the accumulator spring. During shifting with a large throttle opening degree, in order to place emphasis on endurability of the frictional device, the shelf pressure with the large gradient is preferred to shorten the time required for the shift. However, this causes substantial shock to occur during shifting with a small throttle opening. During the shift with a small throttle opening degree, the shelf pressure with small gradient is preferred for lowering shift shock to a satisfactory level. However, this causes a reduction in endurability of the frictional device since the time required for shift becomes long as compared to an appropriate time required for shift with large throttle opening degree.

Thus, it is very difficult to select a spring which can compromise both of the above-mentioned requirements with each other.

An object of the present invention is to improve the existing automatic transmission such that above-mentioned problem is solved without causing any substantial change on component parts.

SUMMARY OF THE INVENTION

According to the present invention, there is provided an automatic transmission for an automotive vehicle including an engine with a throttle which opens in degrees, the automatic transmission including a gear train with an input shaft and an output shaft, the gear train including a frictional device that is hydraulically activated by a hydraulic fluid pressure supplied thereto to effect a predetermined shift from one gear position to another gear position, the automatic transmission, include a hydraulic circuit means for start supplying a servo activating hydraulic fluid to the frictional device at the instant when the predetermined shift is required, causing a ratio of a revolution speed of the input shaft to a revolution speed of the output shaft to vary toward a new gear ratio for another gear position, an accumulator having an accumulator piston means for defining an accumulator chamber which forms a part of the hydraulic circuit means and an accumulator back-up pressure chamber, means for generating an accumulator back-up pressure supplied to the accumulator back-up pressure chamber, a control unit, said control unit including means for generating a control signal supplied to the accumulator back-up pressure generating means, the control signal having a predetermined variable factor, the accumulator back-up pressure generating means varying the magnitude of the accumulator back-up pressure in response to variation of the predetermined variable factor, the control unit including means for varying the predetermined variable factor during the predetermined shift in a predetermined schedule, said control unit also including means for changing the predetermined schedule of variation.

BRIEF DESCRIPTION OF THE DRAWINGS

FIG. 1 is a schematic diagram showing an automotive power train which the present invention is embodied in;

FIGS. 3A, 3B, and 3C when combined side by side, illustrate an electro-hydraulic control system for the automatic transmission shown in FIG. 1;

FIG. 13 is a flow chart similar to FIG. 6 but used in the second embodiment;

FIG. 17 is a chart showing the characteristic of data contained in TABLE 3, which are used as a gain table during 1-2 upshift provided according to the second embodiment, in terms of gain G versus throttle opening degree TH;

FIG. 18 is a chart showing the characteristic of data contained in TABLE 4, which are used as a gain table during 1-2 upshift provided according to the second embodiment, in terms of gain G versus throttle opening degree TH; and FIG. 19 is a timing chart which shows the operation induced by the second embodiment according to the present invention during 1-2 upshift with large or heavy load.

DETAILED DESCRIPTION OF THE INVENTION

Figure 1:
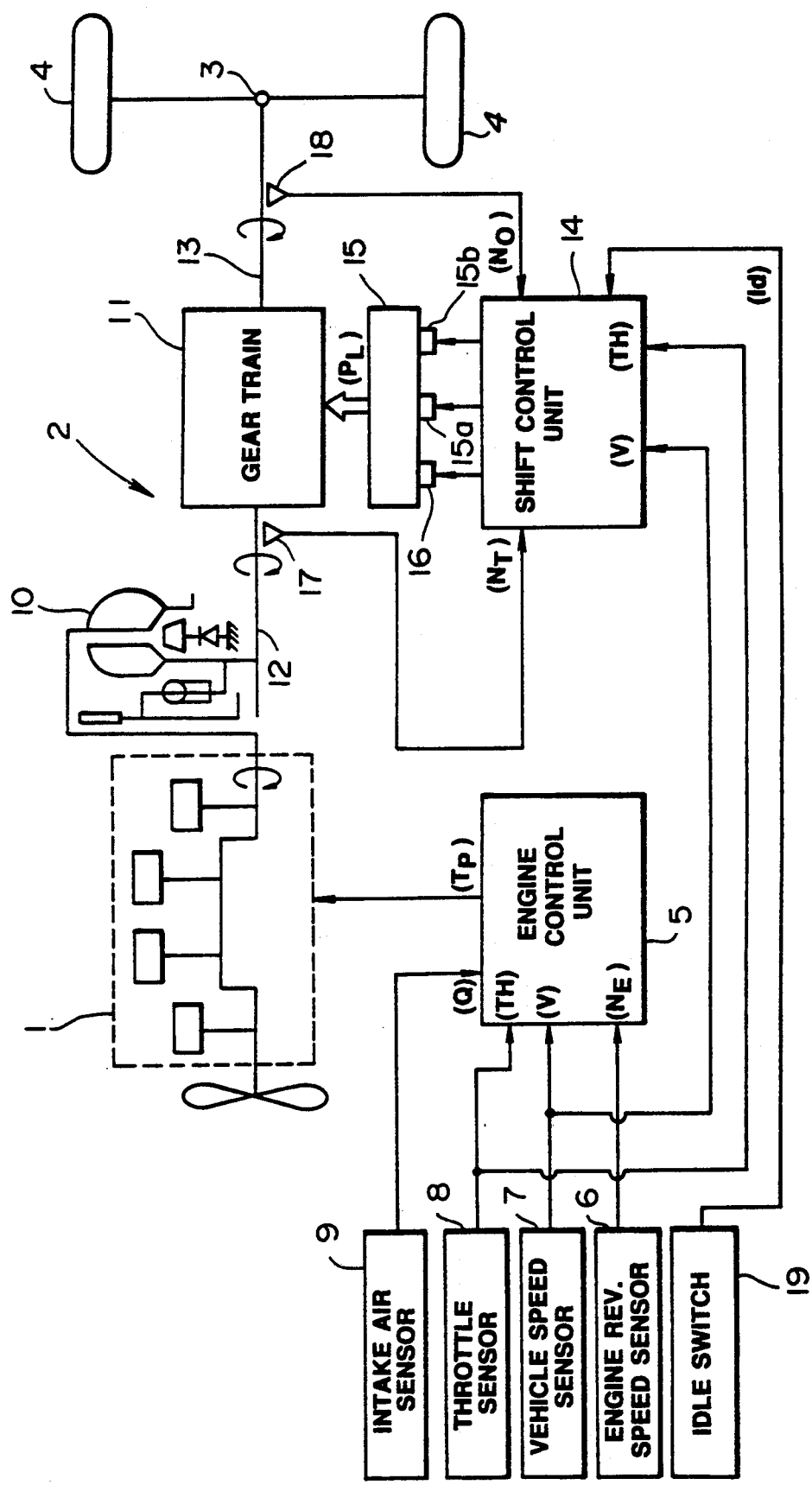

Referring to FIG. 1, there is shown a control system for a power train of an automotive vehicle which the present invention is embodied. In this arrangement an electrically fuel injected internal combustion engine 1 with a throttle valve which opens in degrees is operatively connected by way of an automatic transmission of the RE4RO1A type mentioned before, generally denoted by the reference numeral 2, with a differential gear 3. Driving wheels 4 are connected to the differential 3.

An engine control unit 5 is supplied with inputs $N_E$, V, TH, and Q from an engine revolution speed sensor 6, a vehicle speed sensor 7, a throttle position sensor 8 and an intake air sensor 9.

Based on the inputs of the sensors 6 to 9, the control unit 5 which in this instance is a microcomputer based control unit, determines the appropriate fuel injection pulse width $T_P$ and applies the same to the fuel supply system of the engine. The fuel supply system feeds fuel to the engine in accordance with the fuel injection pulse having a pulse width adjusted to the fuel injection pulse width $T_P$.

In this embodiment, the automatic transmission 2 is of the RE4R01A type described in "NISSAN FULL-RANGE AUTOMATIC TRANSMISSION RE4R-01A TYPE, SERVICE MANUAL, (A261C07)" issued on Mar., 1987 by NISSAN MOTOR COMPANY LIMITED. The automatic transmission of the above mentioned type is also disclosed in the before mentioned U.S. Pat. No. 4,680,992 (Hayasaki et al.) which is hereby incorporated in its entirety by reference.

A torque converter 10 including a lock-up clutch provides an operative connection between the output shaft of the engine 1 and an input shaft 12 of a gear train 11 which has an output shaft 13 connected to the differential 3. The gear train is shiftable among four gear positions and includes a second brake, as a frictional device, that is hydraulically activated by a servo activating hydraulic fluid pressure supplied thereto to effect a 1-2 upshift from the first gear position to the second gear position.

The gear train 11 includes a plurality of planetary gear sets and associated hydraulically actuated frictional device, such as clutches and brakes including the above-mentioned second brake. The brakes and clutches are operated by servo activating hydraulic fluid pressure which during non-shifting stable state is as high as so-called "line pressure" $P_L$. The distribution of and modulation of the servo activating hydraulic fluid pressure is controlled by a control valve assembly 15.

The control valve assembly 15 includes two shift solenoids 15a and 15b, and a line pressure solenoid 16.

Depending on the energization of the shift solenoid 15a and 15b, a plurality of shift valves are conditioned to distribute servo activating hydraulic fluid pressure to the appropriate frictional device or devices.

In this arrangement the four forward gear positions of the automatic transmission can be established in the manner indicated in the table below.

TABLE I

| | GEAR | | | |
|---|---|---|---|---|
| | FIRST | SECOND | THIRD | FOURTH |
| SOL. 15a: | ON | OFF | OFF | ON |
| SOL. 15b: | ON | ON | OFF | OFF |

Figure 2:
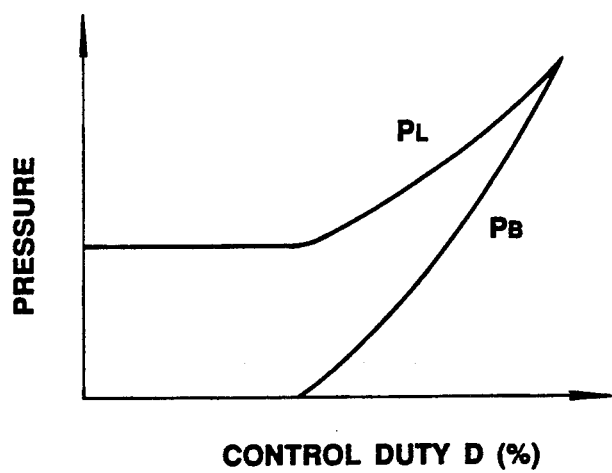
FIG. 2 is a chart illustrating the variations of line pressure $P_L$ and accumulator back-up pressure $P_B$ versus variation of control duty factor D (%)

The line pressure solenoid 16 of the control valve assembly 15 is arranged to be operated on an electric voltage signal whose ON/OFF duty factor or cycle is variable and to control the level of a signal pressure which modulates operation of an accumulator control valve which generates an accumulator back-up pressure $P_B$. The signal pressure is supplied also to a pressure modifier valve which in turn modulates operation of a pressure regulator valve for generating the line pressure $P_L$. As indicated by the curves shown in FIG. 2, the levels of the pressures $P_B$ and $P_L$ increase as the control duty factor D increases.

The shift control unit 14 is arranged to receive data inputs $N_T$ and $N_O$ from input or turbine revolution speed sensor 17 and an output revolution speed sensor 18, respectively. As will be appreciated from the drawings, $N_T$ is indicative of the revolution speed of the input shaft or turbine shaft 12 of the gear train 11, while $N_O$ is indicative of the revolution speed of the output shaft of the gear train 11. The shift control unit 14 further receives data inputs V, TH and Id from the vehicle speed sensor 7, the throttle position sensor 8, and an idle switch 19 which is actually is an idle contact assembly of the throttle switch.

The shift control unit 14 is a microcomputer based control unit which includes as usual an input/output interface control device, a CPU, a RAM, and a ROM. This ROM stores programs of the nature depicted in the flow charts shown in FIGS. 5 and 6. Before entering into the description of the operations along with the programs depicted in these flow charts, brief description is made regarding the gear train 11 and the control valve assembly 15.

Figure 3A:
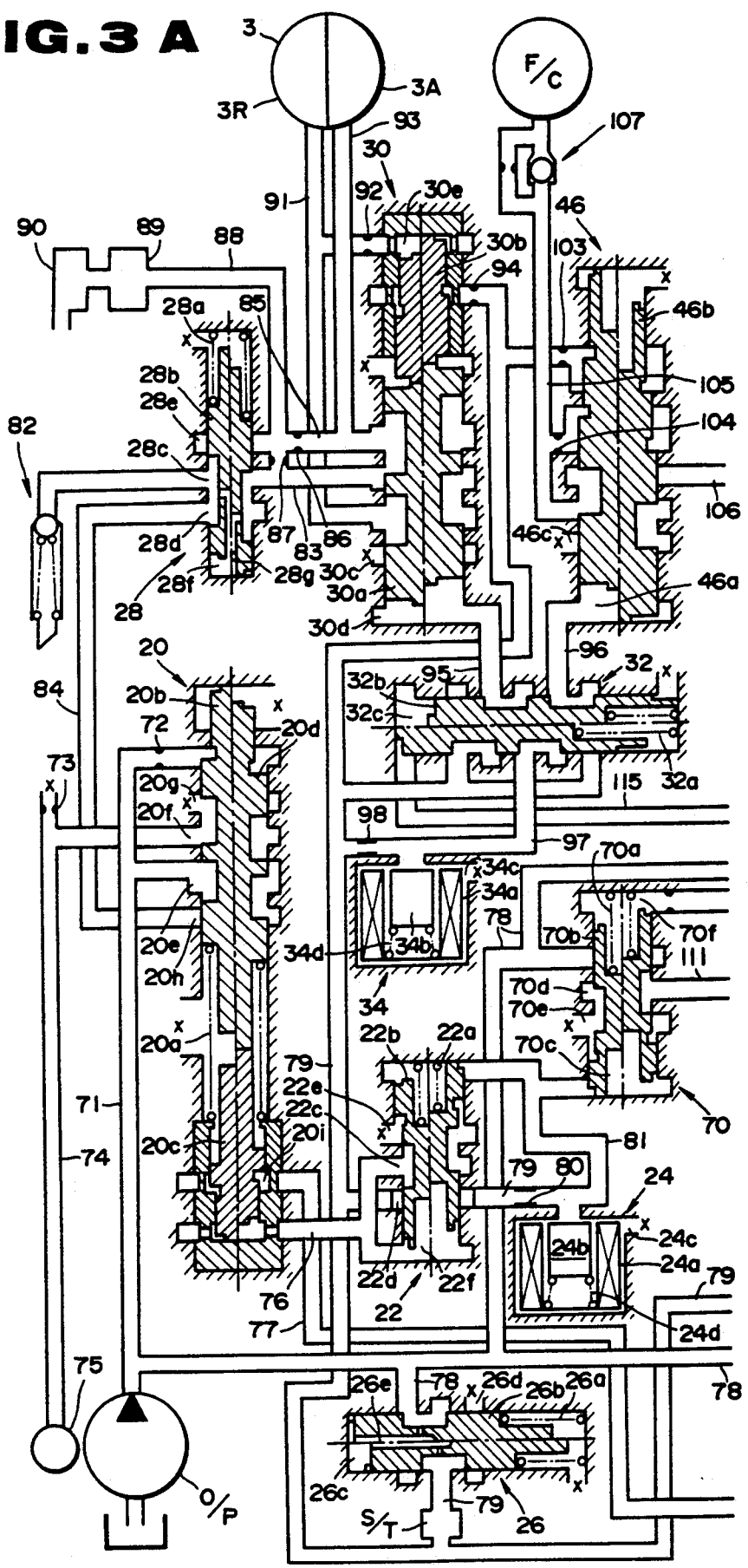
Figure 3B:
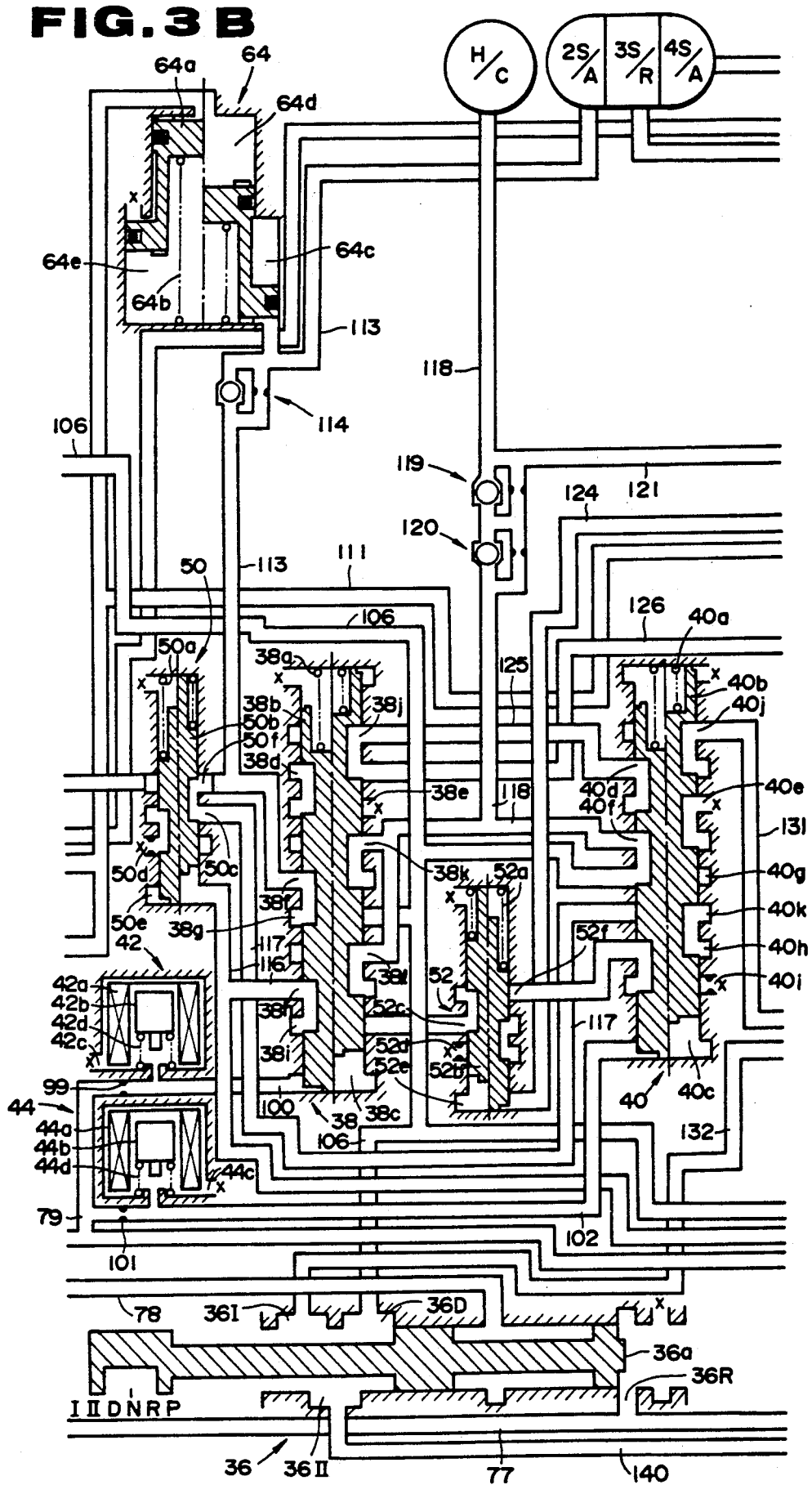

Referring to FIGS. 3A, 3B, 3C, and 4, FIG. 4 shows a schematic diagram of the gear train 11, and FIGS. 3A, 3B, and 3C whem combined illustrates a hydraulic circuit of the control valve assembly 15. The detailed description along with these Figures is hereby omitted because the same is found in U.S. Pat. No. 4,680,992 issued to Hayasaki et al. on July 21, 1987, which has been hereby incorporated by reference in their entirety. Particular attention should be payed to the descriptive parts in connection with FIGS. 1A, 1B, and 1C and 2.

Figure 4:
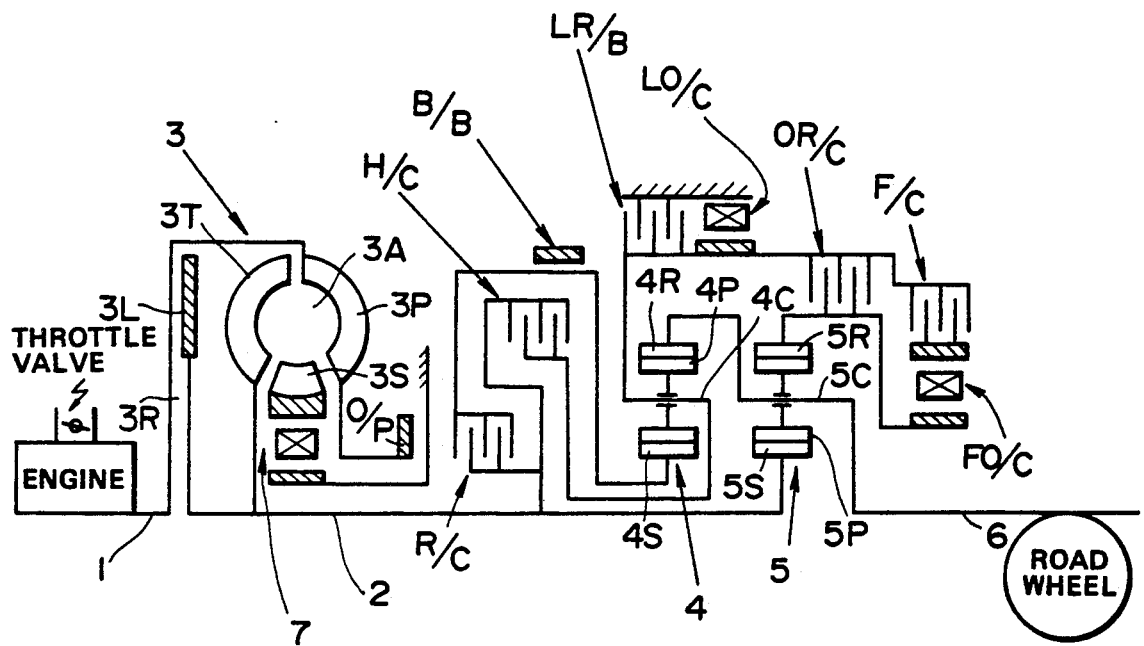
FIG. 4 is a schematic view showing in detail the gear train shown in FIG. 1.

Briefly, in FIG. 4, the second brake mentioned before is denoted by the reference character B/B. Further, in FIGS. 3A, 3B, and 3C, the shift control solenoids and the line pressure solenoid are denoted by the reference numerals 42, 44, and 24, respectively. A 1-2 accumulator 64 is arranged which has an accumulator piston 64a slidably disposed with a fluid tight manner in a differential diameter bore to define, on one end, an accumulator chamber 64e which forms a part of a hydraulic circuit (113, 114, 38) that start supplying a servo activating hydraulic fluid ($P_A$) to a second servo apply chamber 2S/A for second brake B/B at the instant when the 1-2 upshift is required. At this instant, a 1-2 shift valve 38 shifts to an upshift position in response to a change in status of the shift solenoid 42 (viz., 15a in the case of FIG. 1) from the ON state to the OFF state. This causes a ratio of the revolution speed of the input shaft to the revolution speed of the output shaft to vary toward a new gear ratio for the second gear position.

Referring back to the 1-2 accumulator 64, the accumulator piston 64a defines, on the opposite side, an accumulator back-up pressure chamber 64d. An accumulator control valve 70 is provided which generates the accumulator back-up pressure $P_B$ supplied to the back-up pressure chamber 64d. The level of the back-up pressure $P_B$ is determined in response to a signal fluid pressure applied via a hydraulic fluid line 81 (see FIG. 3A). The same signal fluid pressure is applied to a pressure modifier valve 22 which in turn modulates the operation of a line pressure regulator valve 20. The level of the signal fluid pressure is controlled by the line pressure solenoid 24. More specifically, the line pressure solenoid 24 effects pressure regulation on a constant pilot pressure supplied from a pilot valve 26 by controlling the rate at which the hydraulic fluid is drained from the hydraulic fluid line 81.

It will now be appreciated that increasing the duty factor of the control signal supplied to the line pressure solenoid 24 causes the level of the signal pressure to increase, causing the level of the accumulator back-up pressure to increase.

Referring back to FIG. 5, the main control routine of the nature depicted in this flow chart is arranged to run at 10 msec intervals by way of example.

Figure 5:
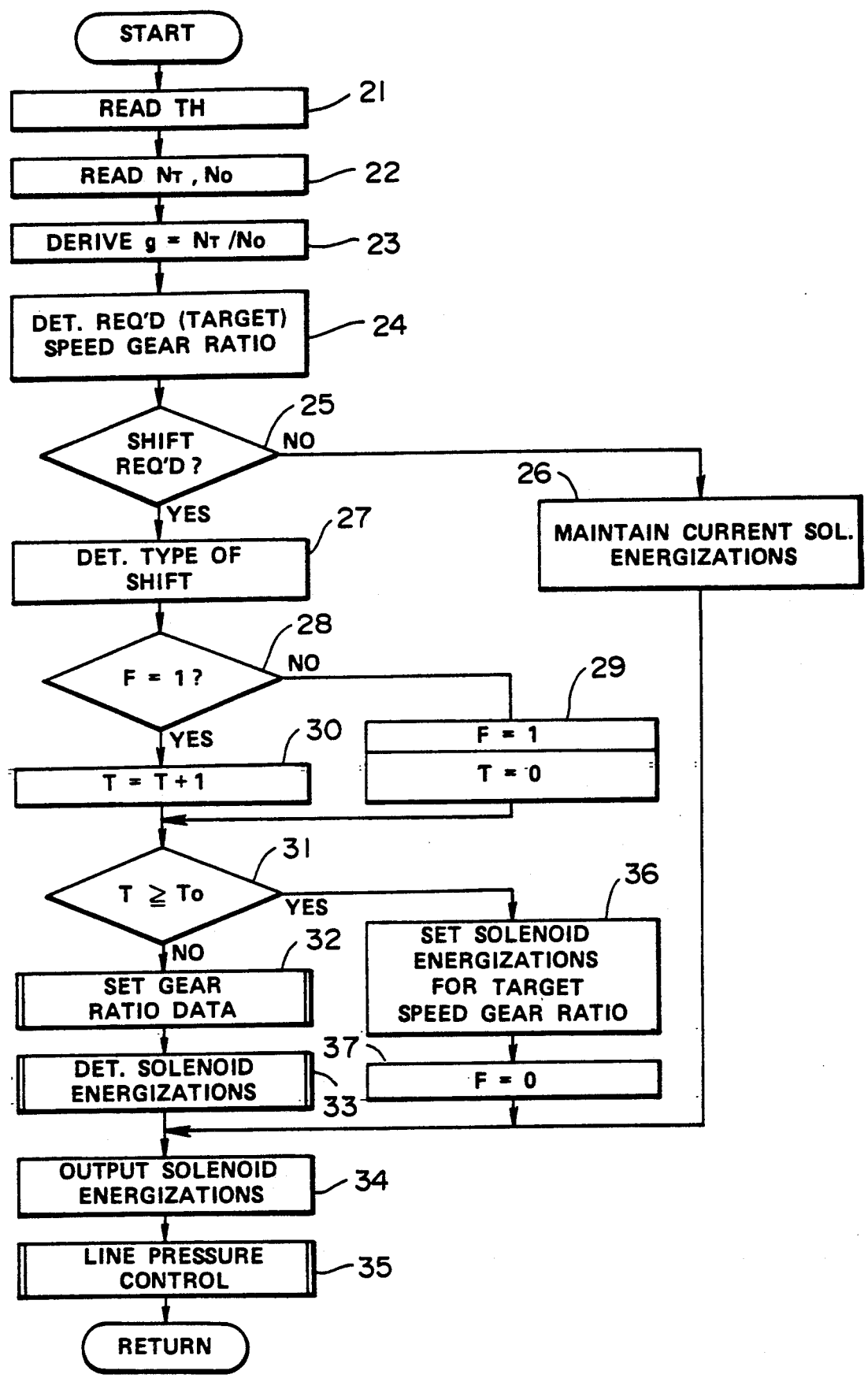
FIG. 5 is a flow chart depicting the steps which are executed by a main control routine.

In FIG. 5, at steps 21 and 22, the outputs of the sensors 8, 17 and 18 are sampled and the instant values of TH, $N_T$ and $N_O$ are read and set in the ROM for further processing. At step 23, the ratio g of the input shaft revolution speed $N_T$ to the output shaft revolution speed $N_O$ is derived. Following this, at step 24, the output of the vehicle speed sensor 7 is sampled and the instant value V read into the ROM. This data is then used in combination with the instant throttle valve opening degree TH to determine, from shift pattern table data, the most appropriate gear position for the transmission is to be conditioned to produce. This is logged as a target gear position.

At step 25, the instant gear position the transmission is conditioned to produce is compared with the target gear position. If there is no difference, the program proceeds to step 26 where a command which maintains the current energization status of the shift solenoid 15a and 15b is set and the program proceeds to steps 34 and 35 where energization signals are outputted to the shift solenoids 15a and 15b and a line pressure sub-routine is performed. It should be noted that this just mentioned line pressure sub-routine will be described later in connection with the flow chart shown in FIG. 6.

However, if at step 25, it is discovered that there is a difference between the target gear position and the current one the transmission is conditioned to produce, then the program proceeds to step 27 where the type of shift which must be implemented to achieve the target gear position is determined.

Next, at step 28, the instant status of a shift flag F is determined. If the value of the shift flag F is not "1", then the program proceeds to step 29 where the shift flag F is set to 1 and a timer count T set to zero. Following this, the program loops to step 31. On the other hand, if the outcome of the enquiry conducted at step 28 is affirmative, then at step 30 the count of timer T is incrementally increased.

Then, at step 31 the count of timer T is checked to determine if a predetermined period of time $T_0$, which has been set for the type of shift indicated as being necessary at step 27, has elapsed or not. While this period has not elapsed, the program proceeds to steps 32 and 33.

Figure 8:
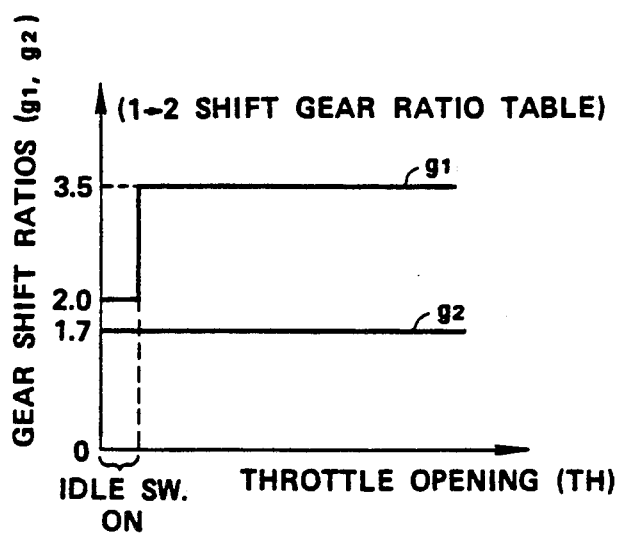
FIG. 8 is a chart showing, in terms of throttle opening degree TH and gear shift ratio values g1 and g2, the timing characteristics which are used during 1-2 upshift.

At step 32, the gear ratio data necessary to implement the shift which is indicated as being necessary at step 27 is read out of the ROM. For example, if a 1-2 upshift is indicated as being necessary, the data such as that depicted in FIG. 8 is read out of the ROM and installed ready for use.

At step 33, the instant value of g is compared is compared with the values of the data prepared at step 32. In response to the outcome of this comparison, the status of the shift solenoids 15a and 15b is determined. For example, if the instant value of g is between g1 and g2, the shift solenoid 15a is de-energized, while the shift solenoid 15b is energized at step 34.

Until the timer T has reached the $T_0$ count, the program continues tio flow through steps 32 to 34. Accordingly, as each run is made the instant value of g is updated and it becomes equal to or less than g2. At this time, the solenoid condition is revised if necessary.

For further information relating the the type of operations which are performed in the above mentioned steps 32 and 33 reference should be made to copending U.S. patent application Ser. No. 07/301,352 (in the name of Yasushi Narita), filed by the same Applicant on Jan. 25, 1989, claiming priority based on Japanese Patent Application No. 63-12712. This United States Patent Application correspond to European Patent Application No. 89 101 294.0, filed on Jan. 25, 1989.

When timer T has reached the count $T_0$ indicative of the above-mentioned period of time having elapsed (step 31), the flow of the program changes and it then proceeds to step 36 where the post shift decision solenoid energization settings, which are necessary to condition the transmission tro produce the target gear position, are set. Then, at step 37 the shift flag F is cleared and set to zero. Owing to the operations performed in the above mentioned steps 36 and 37, the transmission can produce the target gear position even if the change in the value of g is very slow owing to the operation of idle speed up control under very low temperature condition since the the period of time normally required for each type of shift is set as the value of $T_0$.

Figure 6:
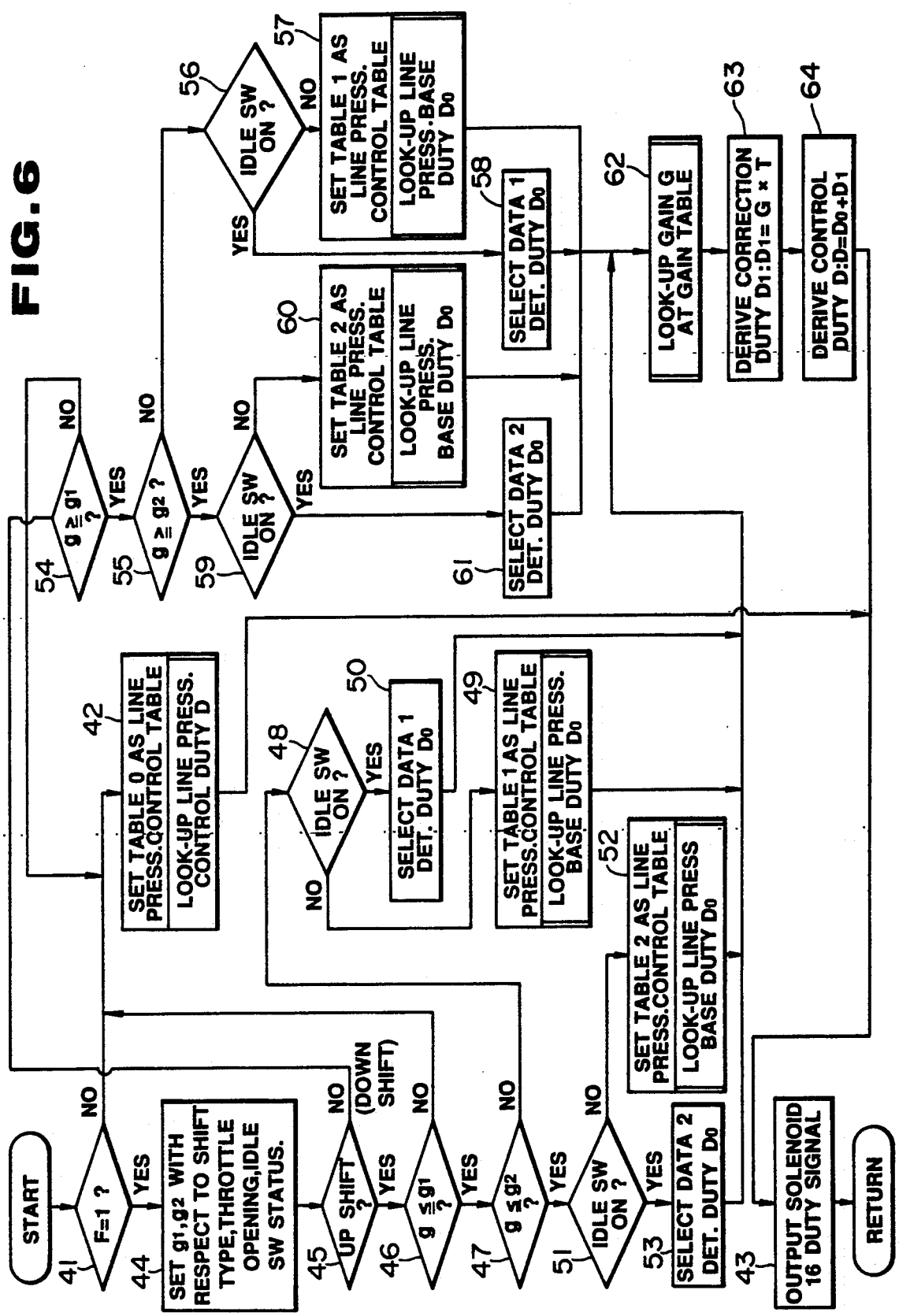
FIG. 6 is a flow chart depicting the steps which are executed in accordance with a sub-routine which is run in the main control routine shown in FIG. 5.
Figure 7:
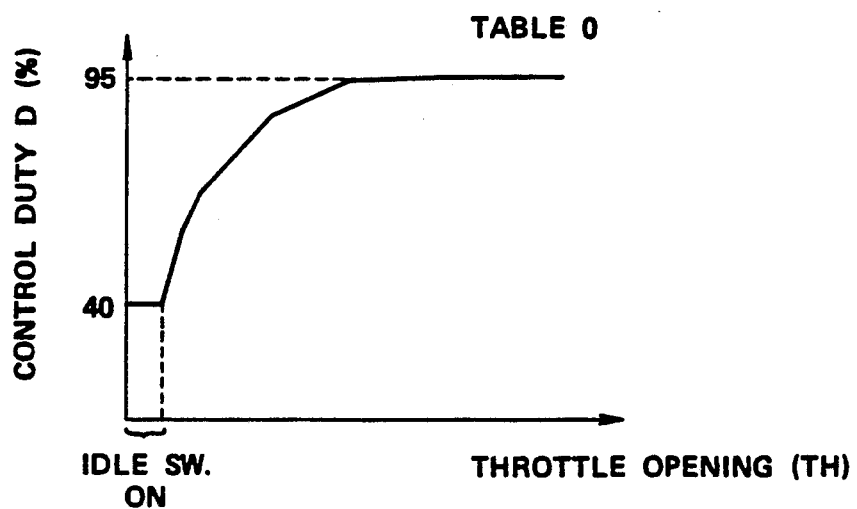
FIG. 7 is a chart showing the characteristic of data contained in TABLE 0 in terms of control duty D versus throttle opening degree TH.

FIG. 6 shows a flow chart which depicts the steps performed by the line pressure control sub-routine which is run at step 35. As will be appreciated the first step of this routine is such as to determined the instant status of the shift flag F. In the event that the shift flag F has not been set to "1", then the routine proceeds to step 42 where Table 0 as shown in FIG. 7 by way of example is read out and set as the instant line pressure control table. The appropriate control duty to be applied to the line pressure solenoid 16 is then looked up using the instant value of TH. Following this, the routine proceeds to step 43 where the appropriate control signal with the control duty indicated at step 42 is applied to the line pressure solenoid 16. It will be noted that while the shift flag F is not set to "1", the transmission is indicated as operating in a non-shift mode. Under these modes of operation, Table 0 provides the appropriate line pressure control characteristics.

On the other hand, if the shift flag F has been set to "1" indicating that a shift mode has been entered, then the program proceeds to step 44. At this step 44, the instant values g1 and g2 which will be used for the solenoid energization control are established on the basis of the type of shift which is indicated as being necessary, the throttle position TH and the status of the idle switch 19. These values are set in memory ready for further processing. More particularly, a variety of different gear ratio tables are prepared for different types of shift, respectively. If 1-2 upshift is indicated as being necessary, a gear ratio table as shown in FIG. 8 is selected and the appropriate instant values g1 and g2 are looked up from this table on the basis of the instant value TH.

It will be noted that in the case of upshifts g1 is greater than g2, while in the case of downshifts, the reverse situation occurs viz., g2 being greater than g1.

Next, at step 45, it is determined if the type of shift which is apt to be induced is an upshift or not. In the case of an affirmative outcome, the routine proceeds to step 46 where it is determined if the instant value g is less than or equal to g1. In the case of an affirmative outcome, the routine proceeds to step 47 where the instant value g is compared with g2 in a manner which determines if it is less than or equal to the same.

In the case of a negative outcome at step 46, the routine proceeds to step 42, it being indicated that the system is operating in a quasi non-shift mode and induces the use of Table 0 for the line pressure control (see steps 42 to 43). On the other hand, in the case of a negative outcome in the enquiry conducted at step 46, the routine proceeds to step 48 where the instant status of the idle switch 19 is determined. In the case the idle switch 19 is ON, the routine proceeds to step 50 where a base duty factor $D_0$ suitable for the type of shift being necessary under this condition is established using tabled data arranged against a variety of different types of shift and entitled DATA 1. Following this, the routine proceeds to step 62 which will be laster described.

In this embodiment, the two sets of data (DATA 1 and DATA 2 of the nature set forth below in TABLE II) are stored in ROM. Data for 1-2 upshift only are shown by way of example.

TABLE II

| DATA 1 | | DATA 2 | |
|---|---|---|---|
| SHIFT | $D_0$ | SHIFT | $D_0$ |
| 1-2 UPSHIFT | 50% | 1-2 UPSHIFT | 95% |

Figure 9:
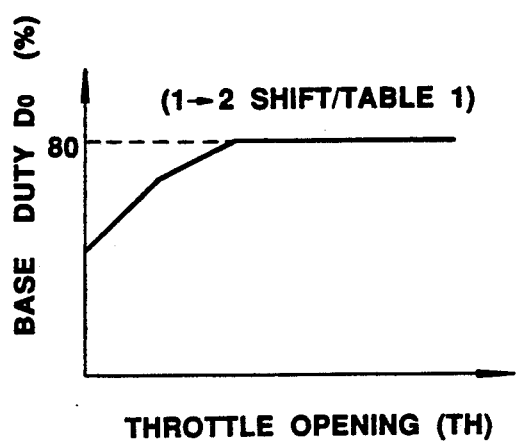
FIG. 9 is a chart showing the characteristic of data contained in TABLE 1, which are used during 1-2 upshift, in terms of base control duty $D_0$ versus throttle opening degree TH.

In the case the outcome of the enquiry conducted at step 48 reveals that the idle switch is not ON then at step 49 TABLE 1 for the instant type of shift is set as the line pressure duty control table, and the appropriate base duty factor $D_0$ for the instant throttle opening degree TH (viz., the value recorded at step 21) is determined by table look-up. Following this the routine proceeds to step 62. A variety of different TABLES 1 for different types of shift are prepared and stored in ROM. FIG. 9 illustrates the TABLE 1 for 1-2 upshift. As shown, a various values of base duty factor $D_0$ are arranged for different values of throttle opening degree TH.

Figure 10:
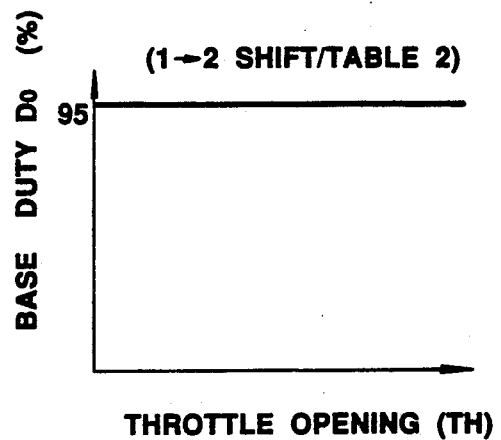
FIG. 10 is a chart showing the characteristic of data contained in TABLE 2, which are used during 1-2 upshift, in terms of base control duty $D_0$ versus throttle opening degree TH.

In the case the routine flows to step 51, the status of the idle switch 19 is checked. In the event that it is not ON, the routine proceeds to step 52 where TABLE 2 data for the instant type of shift is set and the base duty factor for the instant throttle opening degree TH is looked up. FIG. 10 shows TABLE 2 for 1-2 upshift by way of example. Following this step 52, the routine proceeds to step 62. However, in the event that the idle switch 19 is found to be ON at step 51, then at step 53 DATA 2 is used to set the base duty factor $D_0$. Following this, the routine proceeds to step 62.

Steps 54 to 61 are essentially similar to steps 45 to 53 and are arranged to screen the instant value of g against g1 and g2 as set at step 44, and to induce the use of TABLE 1 or 2 or the use of DATA 1 or 2 as the situation demands.

Figure 11:
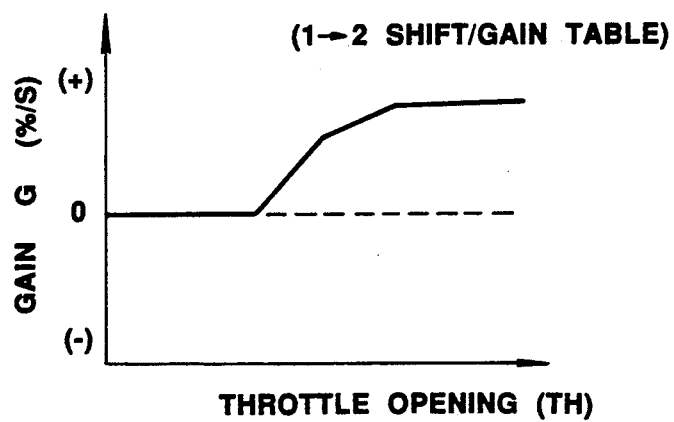
FIG. 11 is a chart showing the characteristic of data contained in GAIN TABLE, which are used during 1-2 upshift, in terms of gain G versus throttle opening degree TH.

The routine flows to step 62 from step 53 or 52 or 49 or 61 or 58. At step 62, a GAIN TABLE suitable for the type of shift indicated as being necessary is selected and a gain G is looked up using the instant value of TH. A variaety of diferent GAIN TABLES for different types of shift, respectively, are stored in ROM. FIG. 11 shows GAIN TABLE for 1-2 upshift. It will be appreciated that the gain G is zero until the throttle opening degree TH increases up to a predetermined value and increases as the throttle opening degree TH increases beyond this predetermined value. Following this step 62, a correction duty value $D_1$ is derived by calculating an equation $D_1 = G_1 \times T$. The, at step 64, a control duty factor D is derived by calculating $D = D_0 + D_1$. Following this, the routine proceeds to step 43 where the control duty factor determined at step 64 is implemented. Actually, the electric control voltage with this control duty factor is applied to the line pressure solenoid 16.

Figure 12A:
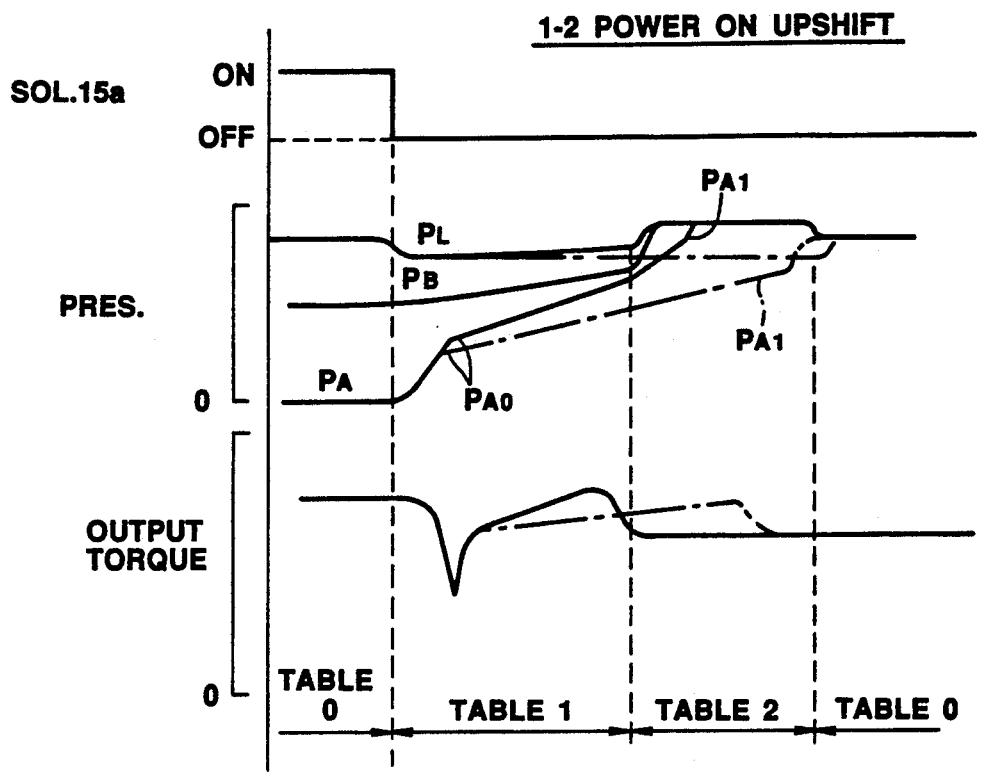
FIG. 12A is a timing chart which shows the operation induced by the first embodiment according to the present invention during 1-2 upshift with large or heavy load.
Figure 12B:
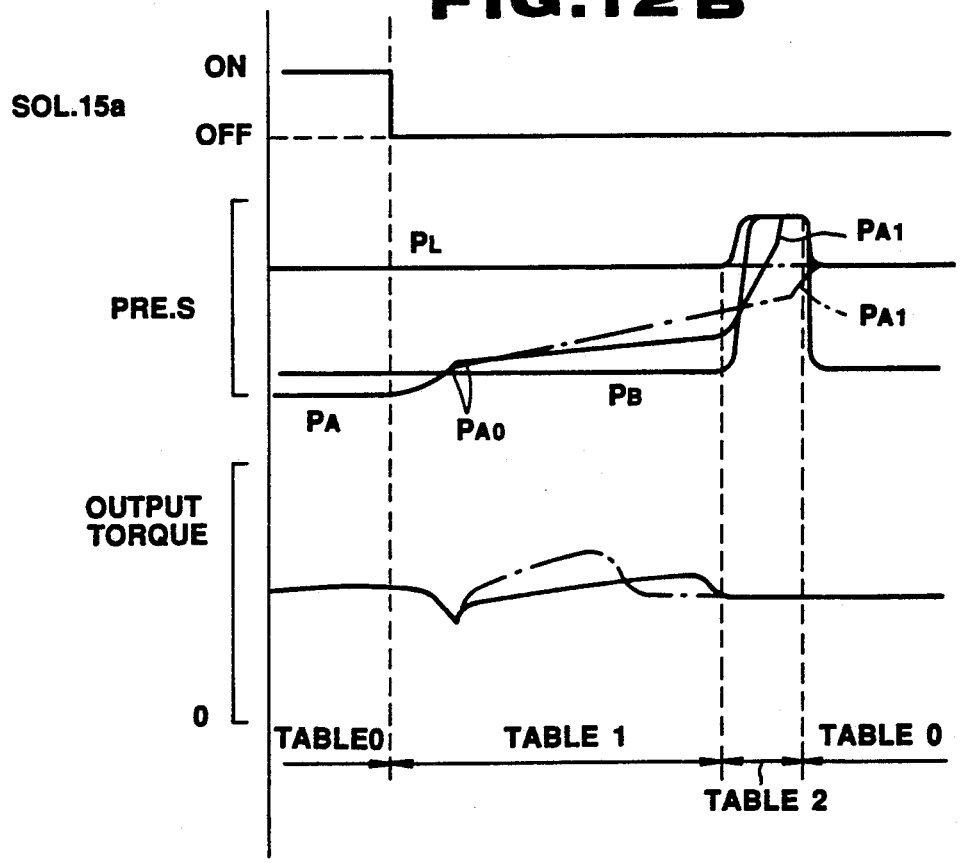
FIG. 12B is a timing chart which shows the operation induced by the first embodiment according to the present invention during 1-2 upshift with small or light load.
Figure 14:
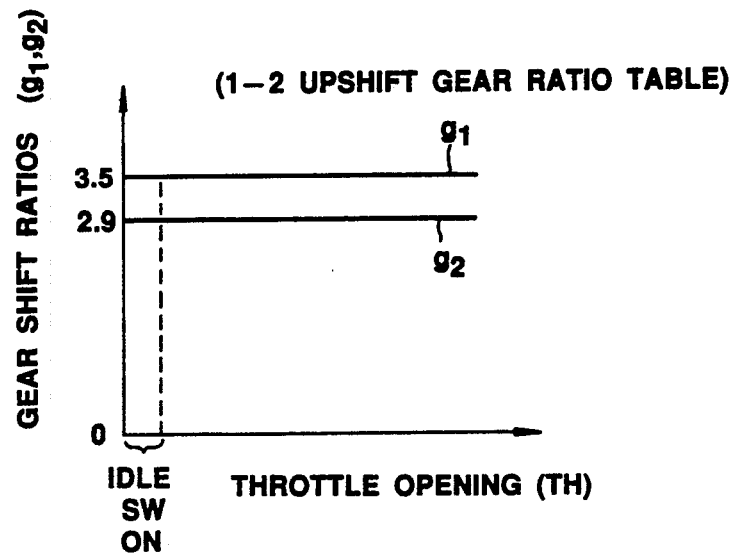
FIG. 14 is a chart showing, in terms of throttle opening degree TH and gear shift ratio values g1 and g2, the timing characteristics which are used during 1-2 upshift provided according to the second embodiment.
Figure 15:
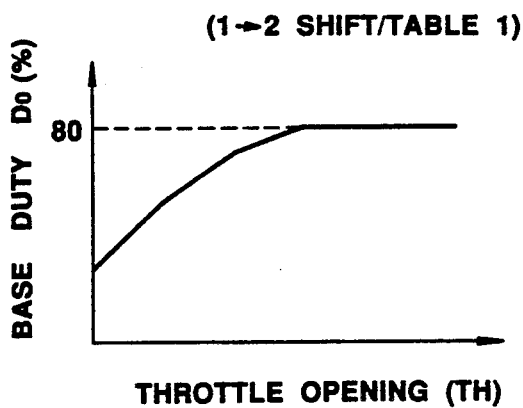
FIG. 15 is a chart showing the characteristic of data contained in TABLE 1, which are used during 1-2 upshift provided according to the second embodiment, in terms of base control duty $D_0$ versus throttle opening degree TH.
Figure 16:
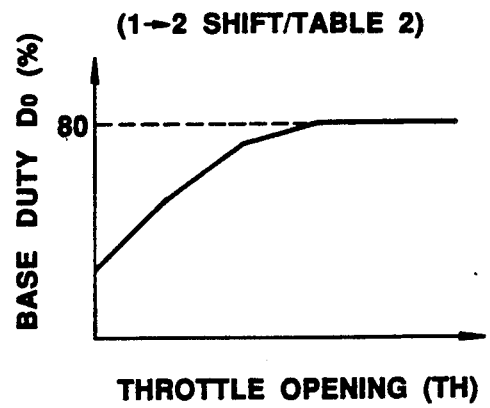
FIG. 16 is a chart showing the characteristic of data contained in TABLE 2, which are used during 1-2 upshift provided according to the second embodiment, in terms of base control duty $D_0$ versus throttle opening degree TH.

The control provided by this first embodiment is deemed to be clear from the timing charts of FIGS. 12A and 12B. FIGS. 12A and 12B are timing charts showing in fully drawn curves variations of accumulator back-up pressure $P_B$ in relation to servo activating hydraulic fluid pressure $P_A$ supplied to the frictional device (viz., a second servo apply chamber 2S/A for second brake B/B, see FIGS. 3B and 4) through a hydraulic circuit (viz., a hydraulic fluid conduit 113) resulting from the control according to the first embodiment. In these Figures, one dot chain lines indicate the corresponding variations according to the prior art.

In the case of the 1-2 power ON upshift shown in FIG. 12A under high load condition where the instant value TH is large as shown in FIG. 12A, the instant values g1 and g2 are set to 3.5 and 1.7, respectively when the shift flag F is set to "1" and it is determined that 1-2 upshift is required and the timer count T starts increasing in an incrementally manner.

Immediately after the shift flag F has set equal to "1", since the gear ratio for the first gear position is 3.027, the shift solenoid 15b is kept at ON status, but the other shift solenoid 15a (viz., shift solenoid 42 in FIG. 3B) is shifted to OFF status, allowing a 1-2 shift valve 38 to upshift to start supplying servo activating hydraulic fluid $P_A$ to the second servo apply chamber 2S/A for the second brake B/B through the hydraulic fluid conduit 113 (see FIGS. 13B and 4), initiating 1-2 upshift. At this time, since the instant value g is less than g1 (=3.5) but greater than g2 (=1.7), TABLE 1 (as shown ion FIG. 9) data are used to give base duty factor $D_0$. When subsequently, the instant value g drops down to or below g2 (=1.7) immediately before reaching the gear ratio value of 1.619 for the second gear position, TABLE 2 (as shown in FIG. 10) data are now used to give base duty factor $D_0$.

Under this circumstance with large throttle opening TH, the value G derived from the GAIN TABLE shown in FIG. 11 is positive and the correction duty value $D_1$ increases as the timer count T increases. As a result, the control duty factor D resulting from the sum of the base duty $D_0$ and correction duty $D_1$ increases as timer count T increases. As will be noted from comparison of TABLE 1 shown in FIG. 9 with TABLE 0 shown in FIG. 7, the base duty factor $D_0$ drops from 95% down to 80% when the instant value g becomes equal to or less than g1. This causes a drop in line pressure $P_L$ immediately after the transmission undergoes 1-2 upshift. Subsequently, the line pressure $P_L$ and accumulator back-up pressure $P_B$ increase as the correction duty value $D_1$ increases with increasing of timer count T. As a result, irrespective of the fact the setting of the accumulator spring (viz., a spring 64b of 1-2 accumulator 64, see FIG. 3B) is weak, the gradient of shelf pressure (viz., a pressure increase from the instant value $P_{A0}$ when an accumulator piston 64a starts stroking from the position as illustrated by the right half thereof as viewed in FIG. 3B to the instant pressure $P_{A1}$ when the accumulator piston 64a reaches the position as illustrated by the left half thereof as viewed in FIG. 3B) as compared to the case as illustrated by the one dot chain line. Accordingly, the frictional device (viz., the second brake B/B shown in FIG. 4) is prevented from being subject to rapid wear caused by elongated time period for shift, avoiding reduction in endurability of the device.

In the case of 1-2 upshift with small throttle opening TH, since the gain G derived from the GAIN TABLE (see FIG. 11) is zero, the control duty factor D remain substantially unchanged and held at a low value even if the TABLE 1 data are used replacing the TABLE 0 data. Thus, until the instant value g drops down or below g2, the control duty factor D remains at a constant low value and the line pressure $P_L$ and accumulator back-up pressure $P_B$ are kept at constant low values, respectively. As a result, the gradient of the shelf pressure becomes small as compared to the conventional case as illustrated by one dot chain line. In this manner, the shift shock is effectively prevented.

When the instant value g becomes equal to or less than g2, the TABLE 2 data are used and thus the base duty of 95% is set irrespective of the instant throttle opening degree TH. Since the maximum control duty factor is set at 95%, the line pressure $P_L$ increases to the maximum level, facilitating the final stroke of the accumulator piston.

As mentioned above, according to the first embodiment the setting of the accumulator spring is weak, but the gradient of pressure increase at shelf portion of the servo activating hydraulic fluid can be increased by increasing the accumulator back-up pressure $P_B$ in response to increase in throttle opening degree TH and increse in time count T.

If desired, the accumulator spring may be set strong. In this case, the instant values of G for low or small load are set negative so as to decrease correction duty $D_1$ gradually as the timer count T increases. In this manner, the gradient of the shelf pressure during shift with low throttle opening degree TH can be set small.

If desired, the correction duty value $D_1$ may be derived by adding a new correction duty value $D_1$ to an old correction duty value during eacvh run of the routine rather than multiplying the value G with the timer count T.

If it is necessary to decrease the area occupied by this system in the memory, a fixed value is used as gain G and the control duty D is given by cauculating the equation $D = D_0(1 + G \times T)$. since the number of tables required decreases.

Alternatively, the control duty D may be determined by multiplying the timer count T with the base duty $D_0$ if values variable in proportion to TH are used as data which the value $D_0$ is derived from.

Referring to FIGS. 13 to 19, a second embodiment according to the present invention is described. This embodiment is substantially the same as the first embodiment previously described except that the characteristics of data of TABLE 1 and TABLE 2 (see FIGS. 15 and 16) are slightly different from their counterparts (see FIGS. 9 and 10) in the case of 1-2 upshift, and the characteristics of gain data G of TABLE 3 and TABLE 4 (see FIGS. 17 and 18) are selectively used instead of the single GAIN TABLE (see FIG. 11) in the case of 1-2 upshift. The characteristics of data of GEAR RATIO TABLE (see FIG. 14) is different from this counterpart (see FIG. 8) in the case of 1-2 upshift. The data of DATA 1 and DATA 2 are different from thier counterparts of the first embodiment and new DATA 3 and DATA 4 are added. Data for 1-2 upshift only are shown by way of example.

TABLE III

| DATA 1 | | DATA 2 | |
|---|---|---|---|
| SHIFT | $D_0$ | SHIFT | $D_0$ |
| 1-2 UPSHIFT | 50% | 1-2 UPSHIFT | 50% |

TABLE IV

| DATA 3 | | DATA 4 | |
|---|---|---|---|
| SHIFT | G | SHIFT | G |
| 1-2 UPSHIFT | 0%/s | 1-2 UPSHIFT | 0%/s |

The sub-routine shown in FIG. 13 is essentially the same as that shown in FIG. 6 except the addition of new steps 42A, 53A, 52A, 58A and 57A and a modified step 63A in the place of steps 62 and 63 which were necessary in FIG. 6.

In FIG. 13, when the routine flows from step 42, 42A and 43, the instant value 95% is set as the control duty D when the throttle opening degree TH is large and correction duty value $D_1$ is ser to zero (see step 42A). Thus, during no-shift mode, the control duty D is determined in accordance with the schedule set by the TABLE 0 (see FIG. 7) in the same manner as is the case in the first embodiment. Let us now assume that the transmission enters 1-2 upshift with large throttle opening degree TH and the instant value g has become equal to or less than g1 (=3.5, see FIG. 14), the routine flow along steps 46, 47, 56, 57, 57A, 63A, 64, and 43 until the instant value g becomes equal to or less than g2 (=2.9, see FIG. 14). Under this circumstance, TABLE 1 (see FIG. 15) and TABLE 3 (see FIG. 17) are set as line pressure control table and gain table, and base duty value $D_0$ and gain value G are determined by table look-up operations using the instant value TH, the duty correction value $D_1$ is increased by the instant value G (see step 63A) and the control duty D is determined as the sum of the instant value $D_0$ and the instant value $D_1$ (see step 64). When the instant value g drops and becomes equal to or less than g2 (=2.9), the routine flows along the steps 47, 51, 52, 52A, 63A, 64, and 43. At this time, TABLE 2 (see FIG. 16) and TABLE 4 (see FIG. 18) are now set as line pressure control table and gain table, respectively, in the place of the above mentioned TABLE 1 and TABLE 3, and base duty value $D_0$ and gain value G are determined by table look-up operations using the instant value TH (see steps 52 and 52A).

On other other hand, if the type of shift is a 1-2 upshift with power OFF, DATA 1 and DATA 3 are set at steps 58 and 58A while the instant value g is lower than or equal to g1 but still larger than g2. In this circumstance, 50% is set as base duty value $D_0$ and 0% is set as gain value G. When the instant value g becomes equal to or less than g2, the routine flows along steps 47, 51, 53, 53A, 63A, 64, and 43, and DATA 2 and DATA 4 are used to determine the base duty value $D_0$ and gain value G. At this time, the base duty $D_0$ is set to 50% and gain value G is set to 0%, respectively.

The control provided by this second embodiment is deemed to be clear from the timing chart of FIG. 19. In the case of the 1-2 power ON upshift shown in FIG. 19 under high load condition where the instant value TH is large, the instant values g1 and g2 are set to 3.5 and 2.9 (see FIG. 14), respectively when the shift flag F is set to "1" and it is determined that 1-2 upshift is required.

Immediately after the shift flag F has set equal to "1", since the gear ratio for the first gear position is 3.027, the shift solenoid 15b is kept at ON status, but the other shift solenoid 15a, initiating 1-2 upshift. At this time, since the instant value g is less than g1 (=3.5) but greater than g2 (=1.7), TABLE 1 (see FIG. 15) and TABLE 3 (see FIG. 17) are used to give base duty $D_0$ and gain G. Since the base duty value $D_0$ drops from 95% (see FIG. 7) down to 80% (see FIG. 15) and the gain value G is set to 0% regardless of the value of TH (see FIG. 17), the control duty D stays at 80% and thus the line pressure $P_L$ drops to a level determined by the duty value 80% and the accumulator back-up pressure drops also. The line pressure and accumulator back-up pressure continue to stays at low constant levels, respectively, until the instant value g becomes equal to or less than g2 (=2.9). At the time when the g becomes equal to or less than g2, TABLE 2 (see FIG. 16) and TABLE 4 (see FIG. 18) are set and used to determine base duty value $D_0$ and gain value G. Since the instant value G derived from TABLE 4 (see FIG. 18) is positive and increases as the instant value TH increases and the correction value $D_1$ increases accordingly as the shift progresses, the control duty factor D and thus the line pressure and accumulator back-up pressure increases quickly toward the maximum level. As a result, the servo activating hydraulic fluid pressure $P_A$ varies in a manner as illustrated. More specifically, the instant pressure $P_{A0}$ when the accumulator piston starts stroking has been lowered since the gain G is set to zero until the value g drops down to or below g2 (=2.9). With this arrangement, therefore, the engagement of the frictional device during the 1-2 upshift is always effected by the shelf portion pressure variation of the servo activating hydraulic fluid pressure $P_A$. Besides, this arrangement according to the second embodiment takes into account a time lag due to a time period required for hydraulic fluid to fill in the hydraulic fluid conduit leading the the frictional device, so that the gain values of TABLE 4 can be set to relatively large ones.

What is claimed is:

1. An automatic transmission for an automotive vehicle including an engine with a throttle which opens in degrees, the automatic transmission including a gear train with an input shaft and an output shaft, the gear train including a frictional device that is hydraulically activated by a hydraulic fluid pressure supplied thereto to effect a predetermined shift from one gear position to another gear position, the automatic transmission, comprising:

hydraulic circuit means for start supplying a servo activating hydraulic fluid to the frictional device at the instant when the predetermined shift is required, causing a ratio of a revolution speed of the input shaft to a revolution speed of the output shaft to vary toward a new gear ratio for the another gear position;

an accumulator having an accumulator piston means for defining an accumulator chamber which forms a part of said hydraulic circuit means and an accumulator back-up pressure chamber;

means for generating an accumulator back-up pressure supplied to said accumulator back-up pressure chamber;

a control unit, said control unit including means for generating a control signal supplied to said accumulator back-up pressure generating means, said control signal having a predetermined variable factor, said accumulator back-up pressure generating means varying the magnitude of said accumulator back-up pressure in response to a variation of said predetermined variable factor, said control unit including means for varying said predetermined variable factor during the predetermined shift in a predetermined schedule, said control unit also including means for changing said predetermined schedule of variation in response to a magnitude of a load on the engine.

2. An automatic transmission as claimed in claim 1, wherein said changing means include means for detecting the magnitude of a load on the engine and generating a load indicative signal indicative of the magnitude of the load detected, means for setting a base portion of said predetermined factor in response to said load indicative signal, means for setting a correction portion of said predetermined factor which is variable in response to the progress of the predetermined shift, and means for determining said predetermined variable factor in response to said base and correction portions which have been set.

3. An automatic transmission as claimed in claim 2, wherein said changing means include means for detecting the progress of the predetermined shift.

4. An automatic transmission as claimed in claim 3, wherein said progress detecting means include means for measuring a time elapsed from the instant when the predetermined shift is required and generating a time indicative signal indicative of said time measured, and said correction portion setting means include means for storing a gain table, means for deriving a gain out of said gain table in response to said load indicative signal and generating a gain indicative signal indicative of said gain derived, and means for multiplying said gain indicative signal with said time indicative signal to give said correction portion.

5. An automatic transmission as claimed in claim 4, wherein said progress detecting means include means for detecting a ratio of a revolution speed of the input shaft to a revolution speed of the output shaft and generating a revolution speed ratio indicative signal indicative of said ratio detected, said base portion setting means include first and second base tables, means for selecting one of said first and second base tables in response to said ratio indicative signal, and means for deriving said base portion out of that one of said first and second base tables which has been selected in response to said load indicative signal.

6. An automatic transmission as claimed in claim 3, wherein said progress detecting means include means for detecting a ratio of a revolution speed of the input shaft to a revolution speed of the output shaft and generating a revolution speed ratio indicative signal indicative of said ratio detected, said correction portion setting means include means for storing first and second gain tables, means for selecting one of said first and second gain tables in response to said revolution speed ratio indicative signal, and means for deriving a gain out of that one of said first and second gain tables in response to said load indicative signal and generating a gain indicative signal indicative of said gain derived, and means for increasing said correction portion by said gain indicative signal.

7. An automatic transmission as claimed in claim 6, wherein said base portion setting means include means for storing first and second base tables, means for selecting one of said first and second base tables in response to said revolution speed ratio indicative signal, and means for deriving said base portion out of that one of said first and second base tables which has been selected in response to said load indicative signal.

* * * * *